(12) United States Patent
Pasquale et al.

(10) Patent No.: US 6,669,847 B2
(45) Date of Patent: Dec. 30, 2003

(54) METHOD FOR WATER DENITRIFICATION

(75) Inventors: Antonio Pasquale, Novara (IT); Carlo Rubini, San Fermo Della Battaglia (IT); Michele Rossi, Peschiera Borromeo (IT); Luigi Cavalli, Novara (IT)

(73) Assignee: Sud Chemie MT S.r.l., Milan (IT)

( * ) Notice: Subject to any disclaimer, the term of this patent is extended or adjusted under 35 U.S.C. 154(b) by 242 days.

(21) Appl. No.: 09/910,175

(22) Filed: Jul. 20, 2001

(65) Prior Publication Data
US 2002/0033366 A1 Mar. 21, 2002

(30) Foreign Application Priority Data
Jul. 25, 2000 (IT) ...................... MI2000A1705

(51) Int. Cl.⁷ .................................. C02F 3/00
(52) U.S. Cl. .................. 210/616; 210/617; 210/760
(58) Field of Search ................. 210/615–618, 210/743, 760

(56) References Cited

U.S. PATENT DOCUMENTS

| | | |
|---|---|---|
| 4,469,599 A | 9/1984 | Henry et al. |
| 4,756,831 A | 7/1988 | Roman et al. |

FOREIGN PATENT DOCUMENTS

| | | |
|---|---|---|
| DE | 36 38 301 | 5/1988 |
| DE | 195 05 436 | 8/1996 |
| EP | 0 226 715 | 7/1987 |
| EP | 0 475 540 | 3/1992 |

OTHER PUBLICATIONS

Rheinheimer G et al: "Stickstoffkreislauf im Wasser", 1988, Oldenbourg, München XP002197930 * p. 42; table 2.6*.

*Primary Examiner*—Chester T. Barry
(74) *Attorney, Agent, or Firm*—Welsh & Katz, Ltd.

(57) ABSTRACT

A method for denitrification of water, in which the water to be denitrified is made to flow over a porous carrier which comprises a transition metal, preferably palladium, used in an amount between 0.01 and 5% by weight on the carrier and on which denitrifying bacterial strains capable of surviving in the presence of hydrogen are made to adhere, and in which hydrogen is used as a reducing agent and the pH of the reaction is adjusted to values of 4.5 to 7.8 preferably by using carbon dioxide.

12 Claims, No Drawings

METHOD FOR WATER DENITRIFICATION

BACKGROUND OF THE INVENTION

The present invention relates to an improved method for removal of nitrates (denitrification) from water that contains nitrates as pollutants.

The nitrate content in underground and surface water is continuously increasing, mainly due to the synthetic or natural fertilizers used in intensive-cultivation agricultural areas.

Ingestion of nitrates by children (infants and young children) is a severe health hazard due to the reduction of nitrates to nitrites and to the subsequent oxidation of hemoglobin to metahemoglobin, which is a stable form and is no longer able to transfer oxygen to the tissues (metahemoglobinemia).

In adults, metahemoglobin is rapidly converted to the oxidized form, which carries oxygen in the blood; accordingly, the World Health Organization believes that a moderate content of nitrites in potable water is not a health risk for adults.

The maximum limit set for nitrites by European Community standards is 50 mg/l; the recommended limit is 25 mg/l and 10 ml/l for children.

The most widely used methods for removing nitrates from water are biological or are based on ion exchange or on the use of reverse-osmosis membranes.

In the case of ion exchange and reverse osmosis, the problem of removing nitrates is transferred elsewhere, since the nitrate-rich water that these processes generate must in turn be disposed.

Biological denitrification uses bacteria which, in an anoxic environment, use organic carbon for growth (heterotrophic processes) or inorganic carbon (autotrophic processes).

In heterotrophic processes, the oxygen that is present in the nitrate molecule is used to oxidize the organic substance (generally sugar) and the nitrates are gradually reduced to elementary nitrogen.

The considerable production of biomass and sludge to be disposed and the frequent countercurrent washing in order to minimize the formation of nitrites are the main limitations of heterotrophic processes.

Moreover, these processes, like autotrophic ones, are characterized by very slow rates.

In autotrophic processes in which the source of inorganic carbon is generally constituted by dissolved carbon dioxide or by the bicarbonates themselves that are present in the water, hydrogen is mostly used as reducing agent.

Only a few microorganisms are capable of surviving and growing in a hydrogen environment: this determines a biological selection of the usable bacteria. Schematically, in autotrophic processes the water is pumped into a pressurized tank, where it is saturated with hydrogen; before entering the reactor, the water receives the addition of carbon dioxide in order to compensate for the loss of $H^{30}$ ions caused by the denitrification reactions.

The bacterial biomass adheres to a filtration bed with high surface area.

The denitrified water then enters an aeration tank, which reoxygenates the water and strips away the residual oxygen; it then passes over gravity filters which retain any biomass and pollutants that can be filtered out. The last step of the process consists of disinfection with ultraviolet rays in order to inactivate any residual microorganisms.

The autotrophic process does not produce large amounts of sludge to be disposed with respect to the heterotrophic one.

Moreover, the risk of bacterial contamination is reduced, since the bacteria capable of surviving in the presence of hydrogen are few and generally consist of the same strains that are present in limited concentration in potable water.

The slowness of the process (generally, 1–2 kg of nitrates removed per $m^3$ of supported biomass per day) is one of its main limitations.

In order to obviate the drawbacks of biological processes, a catalytic process has been proposed in which the nitrates are reduced with hydrogen, using catalysts based on palladium and copper on carriers having a controlled (bimodal) pore radius distribution or on activated carbon (U.S. Pat. No. 4,990,266).

The above indicated catalysts, however, tend to generate ammonia in an amount which exceeds the limits set by the applicable statutory provisions (0.5 mg/l): this occurs when working with amounts of hydrogen exceeding certain limits.

In order to obviate the above mentioned difficulties, catalysts are used which comprise palladium (which is capable of catalyzing the reduction of the nitrites, but not of the nitrates, to elementary nitrogen with high selectivity) mixed with catalyst which comprise palladium and copper, which are capable of catalyzing nitrate reduction (S. Horold et al, Catalysis Today, 17 (1993), 21–30).

The generation of ammonia in amounts exceeding the allowed limits, which occurs if the hydrogen concentration exceeds even low limits at which good nitrate removal activity occurs, causes the process to be of limited practical interest.

BRIEF DESCRIPTION OF THE INVENTION

The aim of the present invention is to provide a water denitrification process which can reduce, with high specific activities, nitrates to elementary nitrogen, avoiding the generation of ammonia beyond the limits allowed by the applicable statutory provisions and/or of toxic substances of any other type.

An object is to provide a method as indicated above which can be performed continuously and at a convenient cost.

This aim, this object and others are unexpectedly achieved with the denitrification process according to the invention, which comprises a stage in which the water containing the nitrate ions to be eliminated is made to flow over an inert porous carrier which supports a transitioon metal capable of activiting the molecular hydrogen, forming metallic hydrides, and on which denitrifying bacterial strains capable of surviving in anoxic conditions in the presence of hydrogen are made to adhere and grow.

DETAILED DESCRIPTION OF THE INVENTION

The process is performed in the presence of hydrogen as a reducing agent, used in the quantity stoichiometrically required by the denitrification reaction or in a larger quantity, adjusting the pH of the reaction to values between 4.5 and 7.8, preferably with carbon dioxide.

The global denitrification reaction occurs according to the following equation: $2NO_3 30\ 5H_2 \rightarrow_{N_2} 2OH + 4H_2O$.

The amount of hydrogen that is stoichiometrically required to reduce to nitrogen 100 mg of $NO_3$ is 8.1 mg.

The hydrogen is preferably used in excess quantities with respect to the stoichiometric quantity in order to ensure complete reduction of the nitrates to elementary nitrogen.

The bacterial strains are used in quantities which are sufficient to reduce the nitrates to elementary nitrogen, working in the presence of hydrogen, in the absence of transition metal.

Examples of usable bacteria are *Pseudomonas fluorescens, Xanthomonas maltophila, Flavobacterium indologenes, Alcaligens eutrophus, Pseudomonas maltophila* and *Pseudomonas putrefaciens*.

Usable carriers are constituted by inert materials with high porosity (higher than 0.3 $cm^3/g$) and a surface area of more than 30 $m^2/g$.

The carriers can be inorganic (porous oxides), such as silica and alumina, or polymeric, such as partially cross-linked styrene-divinyl benzene resins (which can be prepared for example according to the method described in U.S. Pat. No. 4,224,415) or expanded polypropylene with high surface area such as the Accurel(©) product by Akzo, which has an area of 90 $m^2/g$, a porosity of 0.7–0.8 $cm^3/g$ and a cell size of 1–10 microns.

Carriers such as alumina and silica preferably have bimodal porosity with over 20% of their pores having a radius of more than 2000 A.

Carriers capable of adsorbing nitrates at least partially are preferred.

Activated carbon is the preferred carrier, due to its good ability to adsorb both nitrates and hydrogen.

Hydrogen adsorption allows to feed the hydrogen directly into the denitrification reactor, obtaining uniform distribution in the water to be denitrified without having to first solubilize the hydrogen in the water to be denitrified with methods capable of providing injection in the form of very fine bubbles.

The preferred activated carbon is of vegetable origin (coconut carbon) with a porosity of 0.6 to 0.8 $cm^3/g$ and a surface area of 600 to 1100 $m^2/g$.

The carbon is generally in the form of flakes measuring a few millimeters.

The preferred metal is palladium, which is used in an amount between 0.001 and 5% by weight on the carrier, preferably 0.05–0.5%.

It should be noted that the palladium, in the absence of the denitrifying bacteria, is not capable of catalyzing the reduction of the nitrates to elementary nitrogen; it catalyzes nitrite reduction instead.

Accordingly, the synergistic effect of palladium on the denitrifying activity of the bacteria is surprising.

Other usable metals comprise ruthenium, osmium and platinum.

The quantity of these metals is between 0.01 and 5% by weight, preferably 0.1 to 1%.

Palladium can be used in a mixture with other metals, such as Cu and Ag, used in smaller molar proportions than the palladium.

The metals are supported by means of known methods, for example by impregnating the carrier with the dry impregnation method, i.e., by using the solution of the metallic salt in a quantity equal to, or lower than, the volume of the pores.

Reduction to metal is also provided according to known methods, generally using hydrogen as reducing agent.

The growth of bacterial strains on the catalytically active carrier is also performed according to known methods, for example by using nutrients based on sodium phosphate, glucose and/or methanol which can be introduced, with appropriate dosages, so as to ensure a sufficient concentration in input to the denitrification reactor.

The pH is kept within the range of 4.5 to 7.8, preferably with $CO_2$ or with acids which supply anions which are commonly present in potable water, such as for example hydrochloric acid.

The use of $CO_2$ is preferred, since $CO_2$ also acts as a nutrient for bacterial proliferation.

The amount of $CO_2$ to be fed is such as to ensure that the pH remains at the preset value.

A schematic flowsheet of a plant operating according to the process of the invention comprises a reactor which contains the catalytically active carrier on which the bacterial biomass adheres, in which the water enters from below and flows through the catalytic mass with an upward flow in equicurrent with the flow of hydrogen and carbon dioxide.

The amount of $CO_2$ fed is such that the reactor is under a pressure of $CO_2$ (1–5 bar).

The water at the output of the reactor is subjected to flashing in order to recover the carbon dioxide and unreacted hydrogen, which are recycled.

The nitrogen generated during the reaction is partly vented, since an excessive concentration in the solution does not facilitate the denitrification action, since nitrogen is a product of said reaction.

The efficiency of the reduction of the nitrates to elementary nitrogen is preferably limited to 80–90%.

The nitrites that form as an intermediate product are eliminated in a subsequent step, preferably by oxidation with ozone.

It is also possible to use other known denitrification methods.

The specific activity of the process is greater than 5 kg of $NO_3^-$ removed per $m^3$ of reactor per day.

The process can be used not only for the denitrification of water for drinking; it can also be used for industrial water for beverages or for foods or for wastewater downstream of the chemical-biological treatment to which said wastewater is subjected to oxidation to nitrate of ammonia and similar nitrogen impurities contained in said wastewater.

The following examples are provided as non-limitative illustration of the invention.

EXAMPLES

Description of the Experimental Apparatus

The experimental apparatus used to perform the tests reported in the examples is described hereafter. The apparatus is substantially composed of two parts:

a) Preparation of the nitrate solution.

A concentrated solution of nitrates is prepared in the form of sodium nitrate (approximately 6000 ppm) and is stored in a 25-1 tank. This solution, fed by means of a piston pump, is diluted on-line with potable water until the intended dilution (70–100 ppm) is reached. The diluted solution is then sent to the denitrification reactor.

b) Reactor

The denitrification reactor is a stainless steel tube provided with an external jacket which allows to provide thermostatic control of the reactor. The dimensions of the reactor are as follows:

height=120 cm diameter=5.7 cm (cross-section=25.5 cm$^2$)

The reactor is provided, in its lower part, with a flange with the tubes for feeding the solution and the gases ($H_2$ and $CO_2$) and with a gas diffuser. In the upper part, the reactor is provided with a flange on which a tube which supports a thermocouple (for temperature measurement) and a tube for discharging the denitrified solution are inserted. $H_2$, required for the reduction reactions, and $CO_2$, required for bacterial proliferation and also to keep the pH constant, are fed to the bottom of the reactor. The two gases are taken from a cylinder, reduced to the required pressure, and then measured and controlled by virtue of mass flow meters. The denitrified solution is discharged from the top of the reactor into a glass tank; the level is controlled by means of an infrared system. The pressure is maintained at the intended level by means of a pressure control switch: nitrogen is added in the tank in order to keep the pressure constant.

Example 1

Bacterial Denitrification With Activated Carbon

A vegetable activated carbon, having the following characteristics:

Surface area=900–1100 m$^2$/g

Pore volume=0.65–0.75 ml/g

Bulk density=0.49 g/ml

Particle size:

>4 mesh=3%

4–8 mesh=pressure of 2.7 atm with $CO_2$.

Initially, the flow-rate of the potable water is approximately 2 l/h; the flow-rate is then gradually increased to 4 l/h. After approximately 170 hours, samples of the water in output are analyzed: the results, together with the conditions of the test, are given in the accompanying table.

The analysis methods were:

Nitrates: ion chromatography

Nitrites: ion chromatography and colorimetry (APHA-sulphanilic acid calorimetric method);

Ammonia: colorimetry (Nessler); ion-selective electrode; and Kjeldahl.

As is evident, the system, which is purely bacterial, is capable of converting the nitrates without forming $NH_3$: the observed conversion, however, is unsatisfactory, since it does not substantially lower the level of the nitrates. This result is in accordance with the literature on purely bacterial denitrification, in which the quantity of nitrates that is eliminated (volumetric load) is low; specifically, it is lower than 1 kg $NO_3^-$/day*m$^3$ of reactor.

Example 2

Catalytic Denitrification

1) Preparation of the catalyst 625 g of activated carbon having the same characteristics as the activated carbon of the preceding example are loaded into a quartz jar having the following dimensions: height 21 cm, diameter 20 cm, useful volume approximately 2 liters. The jar is mounted on an appropriately provided metal basket which is rigidly coupled to a gearmotor and can rotate at a variable rate.

The following solutions are furthermore prepared:

A) 9.7 g of a solution of $Na_2PdCl_6$ at 9.7% by weight (which corresponds to 0.66 g of Pd) receive the addition of 3.1 g of HCl at 36% and then of 60 ml of demineralized water.

B) 4.1 g of $H_2O_2$ at 35% are weighed

C) The third solution is prepared by diluting 31 g of sodium hypophosphite ($NaH_2PO_2$*$H_2O$) in 400 ml of demineralized water.

The two solutions A and B are mixed, left to settle for 10 minutes, and then sprayed with a gas chromatography sprayer onto the carbon, which is kept under agitation. The operation takes approximately 20 minutes. The rotation of the jar is then stopped and solution C is poured onto the impregnated carbon. Bubbles of $H_2$ are seen to form; when the generation of bubble ceases, rotation is resumed for a few minutes. The resulting catalyst is transferred into a 2-liter separator funnel, drained and then washed with demineralized water until the chlorides are eliminated. The catalyst is then dried in a stove and then heated in a muffle furnace at 370° C. (time to reach 380° C. is approximately 3 hours; temperature holding time is 8 hours). All the operations are performed in a nitrogen stream.

2) Denitrification test

The catalyst prepared as described above is loaded into the reactor: the loaded quantity is 2.1 liters. After loading, in situ reduction with $H_2$ and $N_2$ (30% $H_2$ mix) is performed; then the potable water, with the addition of 110 ppm of nitrates in the form of sodium nitrate, and $H_2$ (flow-rate 3 l/h) begin to be fed. $CO_2$ is fed in order to avoid assisting bacterial proliferation.

The system is pressurized (2.8 atm) with $CO_2$ and the water flow-rate is increased to 8.3 l/h.

The experimental apparatus and the analysis methods are the ones described earlier. Samples are taken and analyzed after 16 hours: the results are listed in the table.

As can be seen, in this case also the conversion is not satisfactory and ammonia is seen to form.

Example 3

Denitrification—Combined Catalytic-Bacterial System

1) Preparation of catalyst

The catalyst is prepared according to the methods followed in example 2. After preparation, the catalyst is treated with the *Pseudomonas fluorescens* bacterium: the medium for assisting the growth of the bacterium contains glucose and $NH_4NO_3$ as sources of, respectively, carbon and nitrogen. The optimum pH for growth was found to be between 7 and 8.

2) Denitrification Test 1.8 l of catalyst containing Pseudomonas is loaded into the reactor. Potable water at a flow-rate of 3 l/h and $H_2$ at a flow-rate of 0.24 l/h are then fed. The pressure is stabilized at 2.8 atm. $CO_2$ begins to be fed in order to buffer the alkalinity to assist bacterial growth; the pH stabilizes at 7.6. The water flow-rate is gradually increased to 10.5 l/h and pressure is gradually raised to 3.4 atm. The analysis equipment and methods are the ones described in Example 1. The results listed in the table show complete conversion of nitrates and minimal generation of $NH_3$ and nitrites. This result indicates that the combined catalytic (Pd) and bacterial (Pseudomonas) system is more effective than the separate catalytic and bacterial systems; conversion is in fact total even if the space velocity is high. The volumetric load reaches 8.6 kg $NO_3$/day*m$^3$ of reactor.

Example 4

Denitrification—Combined Catalytic-Bacterial System

The catalyst of the preceding example and the water of the column were discharged and stored at low temperature for 15 days. The catalyst and the water stored in a refrigerator are loaded into a column: approximately 300 ml of fresh catalyst is added on top of them. The system is slowly brought to the steady state and after 76 h the parameters have been reached and the conversions are high. After 431 h of operation, the results are listed in the table EX. 4.

In this case also, the results are satisfactory, thus confirming that the combined system is more active than the two separate systems. In this case also, the generation of a small amount of nitrites is observed: a sample of water listed in the table was subjected to oxidation with ozone (20 ppm). After treatment, the nitrites were found to be absent, since they had been fully converted to nitrates.

Example 5

Denitrification—Combined Catalytic-Bacterial System

The conditions of the test are the same as in Example 4. The catalyst was prepared as specified in Example 3, with the difference that the Pd content was brought to 0.15% by weight. The data of the table confirm the data obtained in the two previous tests.

fluorescens, Xanthomonas maltophila, Flavobacterium indologenes, Alcaligens eutrophus, Pseudomonas maltophila and Pseudomonas putrefaciens.

3. The method according to claim 1, wherein the transition metal is palladium, used in quantities of 0.05 to 0.5% by weight on the carrier.

4. The method according to claim 1, wherein the carrier is constituted by vegetable activated carbon which has a surface area of 600 to 1100 $m^2/g$ and a porosity of 0.6 to 0.8 $cm^3/g$.

5. The method according to claim 1, wherein the carrier is selected from the group consisting of porous inorganic oxides and polymeric materials having a surface area of more than 30 $m^2/g$.

6. The method according to claim 1, wherein the hydrogen is used in a quantity higher than the method according to claim 1, wherein the water to be denitrified is made to flow from the bottom of a denitrification reactor through the catalytic mass with an ascending flow in equicurrent with the flow of hydrogen and carbon dioxide.

7. The method according to claim 1, wherein the pH is adjusted by using carbon dioxide.

8. The method according to claim 7, wherein the denitrification reaction is conducted under a pressure of carbon dioxide.

TABLE 1

|  |  |  | Example | 1 | 2 | 3 | 4 | 5 |
|---|---|---|---|---|---|---|---|---|
|  | CARRIER |  |  | activated carbon | activated carbon | activated carbon | activated carbon | Activated carbon |
|  | BACTERIA |  |  | yes | no | yes | yes | Yes |
|  | CATALYST |  |  |  |  |  |  |  |
|  | Pd | % weight |  | — | 0.1 | 0.1 | 0.01 | 0.15 |
|  | Quantity | 1 |  | 1.4 | 2.1 | 1.8 | 2.1 | 2.6 |
| Reaction conditions | FEED POTABLE WATER |  |  |  |  |  |  |  |
|  | FLOW-RATE | l/h |  | 4 | 8.3 | 10.5 | 10.2 | 10.5 |
|  | $NO_3^-$ CONCENTRATION | ppm |  | 130 | 110 | 74 | 880 | 85 |
|  | GAS |  |  |  |  |  |  |  |
|  | $H_2$ FLOW-RATE | Nl/h |  | 0.524 | 0.59 | 0.826 | 0.86 | 0.672 |
|  | $CO_2$ FLOW-RATE | Nl/h |  | 1.9 | — | 8 | 7.7 | 4 |
|  | LHSV | h-1 |  | 2.8 | 4 | 5.8 | 4.86 | 4 |
|  | TEMPERATURE | ° C. |  | 17 | 18 | 15 | 15 | 15 |
|  | PRESSURE | atm |  | 2.7 | 2.8 | 3.4 | 2.8 | 2.8 |
|  | $H_2/NO_3$ RATIO | molar |  | 2.79 | 1.79 | 2.94 | 2.92 | 2.08 |
| results | PH out |  |  | 5.7 | 5.8 | 5.8 | 5.8 | 5.85 |
|  | $NO_3^-$ | ppm |  | 108.6 | 90 | 0 | 0 | 15.2 |
|  | $NO_3^-$ CONVERSION | % |  | 16.5 | 18 | 100 | 100 | 82 |
|  | $NO_2^-$ | ppm |  | 9.7 | 1 | 11 | 14 | 12.4 |
|  | $NH_3$ | ppm |  | 0 | 2 | 0.4 | 0 | 0.2 |
|  | VOLUMETRIC LOAD | Kg $NO_3$ conv/day $m^3$ of reactor |  | 0.82 | 1.8 | 8.8 | 7.7 | 5.6 |

The disclosures in Italian Patent Application No. MI 2000A001705 from which this application claims priority are incorporated herein by reference.

What is claimed is:

1. A method for removing nitrates from water containing nitrates as pollutants, comprising a stage in which the water is made to flow over an inert porous carrier which supports a transition metal capable of activating molecular hydrogen, forming metallic hydrides, and on which denitrifying bacteria adhere which can survive in anoxic conditions and in the presence of hydrogen, and wherein hydrogen is used as a reducing agent and is made to react in the stoichiometric quantity required by the denitrification reaction or in a larger quantity, and the pH of the reaction is adjusted to values from 4.5 to 7.8 with carbon dioxide or with acids which provide anions that are commonly present in potable water.

2. The method according to claim 1, wherein the bacteria are selected from the group consisting of Pseudomonas 9. The method according to claim 1, wherein the denitrified water from which the unreacted hydrogen, nitrogen and carbon dioxide are degassed beforehand by flashing is treated with ozone in order to eliminate the presence of nitrites.

10. The method according to claim 1, wherein the water to be denitrified is made to flow from the bottom of a denitrification reactor through the catalytic mass with an ascending flow in equicurrent with the flow of hydrogen and carbon dioxide.

11. The method according to claim 1, applied to the denitrification of water for potable use.

12. The method according to claim 1, applied to the denitrification of industrial water for beverages or food or wastewater containing nitrates.

* * * * *